(12) United States Patent
Huberman et al.

(10) Patent No.: US 11,722,432 B1
(45) Date of Patent: *Aug. 8, 2023

(54) METHODS FOR MANAGING MULTI-CHANNEL NETWORK TRAFFIC

(71) Applicant: Cable Television Laboratories, Inc., Louisville, CO (US)

(72) Inventors: Bernardo Huberman, Palo Alto, CA (US); Lin Cheng, Superior, CO (US); Luis Alberto Campos, Superior, CO (US); Thomas Sandholm, Mountain View, CA (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/559,695

(22) Filed: Dec. 22, 2021

Related U.S. Application Data

(63) Continuation of application No. 16/403,152, filed on May 3, 2019, now Pat. No. 11,240,175.

(60) Provisional application No. 62/683,696, filed on Jun. 12, 2018, provisional application No. 62/666,241, filed on May 3, 2018.

(51) Int. Cl.
*H04L 47/80* (2022.01)
*H04W 28/02* (2009.01)
*H04L 41/5025* (2022.01)
*H04L 41/5009* (2022.01)

(52) U.S. Cl.
CPC ........ *H04L 47/808* (2013.01); *H04L 41/5009* (2013.01); *H04L 41/5025* (2013.01); *H04W 28/0268* (2013.01)

(58) Field of Classification Search
CPC ... H04L 47/808; H04L 41/5025; H04L 43/50; H04L 41/5009; H04L 41/145; H04L 43/0876; H04L 47/828; H04W 28/0268
See application file for complete search history.

(56) References Cited

U.S. PATENT DOCUMENTS

| | | | |
|---|---|---|---|
| 7,343,337 B1* | 3/2008 | Cieliebak | G06Q 10/0631 705/36 R |
| 8,863,096 B1* | 10/2014 | Bucur | G06F 11/3604 717/124 |
| 11,101,949 B2* | 8/2021 | Park | H04L 5/0048 |
| 11,240,175 B2* | 2/2022 | Huberman | H04W 28/0268 |
| 2013/0214144 A1* | 8/2013 | Hannemann | G01T 1/17 250/252.1 |
| 2015/0127809 A1* | 5/2015 | Akella | H04L 47/125 709/224 |
| 2019/0104069 A1* | 4/2019 | Kommula | H04L 47/125 |

(Continued)

*Primary Examiner* — Mehmood B. Khan
(74) *Attorney, Agent, or Firm* — Elevated IP, LLC

(57) ABSTRACT

The present disclosure generally relates to apparatus, software and methods for managing multi-channel network traffic to alleviate congestion, improve service quality and make efficient use of channel capacity. The disclosed apparatus, software and methods alleviate congestion and improve service quality by minimizing variance within a channel and/or increase overall traffic flow by minimizing the variance between channels. One or both of these objectives can be accomplished using modern portfolio theory to optimize at least one network usage parameter based on the mean and variance of the parameter(s).

20 Claims, 11 Drawing Sheets

(56) References Cited

U.S. PATENT DOCUMENTS

2020/0021515 A1\* 1/2020 Michael .................. H04L 45/24
2021/0201413 A1\* 7/2021 Schillinger ............ G06Q 40/06

\* cited by examiner

METHODS FOR MANAGING MULTI-CHANNEL NETWORK TRAFFIC

CROSS-REFERENCE TO RELATED APPLICATIONS

This application is a continuation of U.S. patent application Ser. No. 16/403,152, filed May 3, 2019, which claims the benefit of and priority to U.S. Provisional Patent Application Nos. 62/666,241, filed May 3, 2018, and 62/683,696, filed Jun. 12, 2018, each of which is hereby incorporated by reference in its entirety.

STATEMENT REGARDING FEDERALLY SPONSORED RESEARCH

None.

BACKGROUND

In most current communication networks, resource allocation to each user is determined mainly by the user's Service Level Agreement (SLA) and geographical location. Users' behavior is rarely taken into consideration. In addition, the resource is allocated with fixed granularity and dedicated media. This leads to large variations of traffic flow over time within a certain communication channel and large traffic differences between different communication channels, which consequently leads to low network efficiency and potential saturation. For example, a channel mainly shared by multi-Gbps business users experiences large variations over time, namely, large peaks during the daytime on weekdays. A channel shared by multi-Mbps residential users experiences large variations too, usually peaks during evening times and weekends. These variations lead to either congested or idle channels and consequently compromise the service bandwidth.

SUMMARY

The present disclosure generally relates to apparatus, software and methods for managing multi-channel network traffic to alleviate congestion, improve service quality and make efficient use of channel capacity. The disclosed apparatus, software and methods alleviate congestion and improve service quality by minimizing variance within a channel and/or increase overall traffic flow by minimizing the variance between channels. One or both of these objectives can be accomplished using modern portfolio theory to optimize at least one network usage parameter based on the mean and variance of the parameter(s).

In an aspect, a method of managing multi-channel network traffic comprises: gathering data associated with each network user's traffic; for a plurality of network users, allocating each network user's traffic to one or more channels of the multi-channel network to create a test scenario; calculating a mean and variance of the data based on the test scenario; repeating the steps of allocating and calculating; and identifying one or more test scenarios as providing a beneficial allocation of network traffic when the test scenario minimizes the variance of traffic in each channel.

In an embodiment, a beneficial allocation of network traffic comprises minimizing the difference in traffic volume between the channels of a multi-channel network.

In an embodiment, the step of allocating each network user's traffic to one or more channels of the multi-channel network comprises partitioning the traffic of at least one network user to more than one channel.

In an embodiment, the step of allocating each network user's traffic to one or more channels uses modern portfolio theory.

In an embodiment, a method of managing multi-channel network traffic further comprises implementing one of the beneficial allocations on the multi-channel network, and optionally integrating portions of each network user's traffic that have passed through a plurality of the channels.

In an embodiment, the step of identifying a beneficial allocation of network traffic excludes any test scenario that does not meet minimum service requirements. For example, the minimum service requirements may comprise a bandwidth equal to or greater than a required minimum bandwidth, such as a bandwidth stipulated by regulation or contract (e.g., a service level agreement (SLA)).

In an embodiment, the step of allocating each network user's traffic occurs by random allocation, pairing users with negatively correlated data or pairing users with positively correlated data. In an embodiment, the step of allocating each network user's traffic comprises limiting the depth of mixture or partition sizes for one or more users.

In an embodiment, the multi-channel network is an optical network, a coaxial network, a hybrid fiber-coaxial (HFC) network, a wireless network or a combination thereof.

In an embodiment, a channel of the multi-channel network is a physical communication channel (e.g., a wavelength channel, an optical fiber channel, a coaxial channel), a wireless channel, or a time/frequency/logical channel defined by protocols (e.g., a WiFi channel or a DOCSIS channel) or a combination thereof.

In an embodiment, the traffic on the multi-channel network is only downlink traffic, only uplink traffic, both downlink traffic and uplink traffic allocated independently, or both downlink traffic and uplink traffic allocated in combination. In an embodiment, downlink traffic and uplink traffic from each network user are optimized independently or dependently.

In an embodiment, each network user is a group of network users. For example, network users may be grouped as a geographical group, a service group, a traffic group or by other parameters.

In an embodiment, the data associated with each network user's traffic is selected from the group consisting of bandwidth usage, average bandwidth usage, mean bandwidth usage, bandwidth usage variance, temporal bandwidth usage, temporal bandwidth usage variance, service level agreement (SLA) type, geographic location, available infrastructure and/or uplink-downlink ratio. In an embodiment, temporal bandwidth usage comprises hourly usage, daily usage, seasonal usage or combinations thereof.

In an embodiment, the data is weighted in the step of calculating.

In an embodiment, the method is repeated continuously or periodically, such as when new users or new infrastructure are added to the network.

In an aspect, a non-transitory computer-readable medium has a plurality of non-transitory instructions executable with a processor to facilitate management of traffic over a multi-channel network, the plurality of non-transitory instructions being executable for: gathering data associated with each network user's traffic; for a plurality of network users, allocating each network user's traffic to one or more channels of the multi-channel network to create a test scenario; calculating a mean and variance of the data based on the test scenario; repeating the steps of allocating and calculating;

and identifying one or more test scenarios as providing a beneficial allocation of network traffic when the test scenario minimizes the variance of traffic in each channel.

In an embodiment, the plurality of non-transitory instructions are executable for identifying one or more test scenarios as providing a beneficial allocation of network traffic comprising minimizing the difference in traffic volume between the channels of a multi-channel network.

In an embodiment, the plurality of non-transitory instructions are executable for partitioning the traffic of at least one network user to more than one channel, and optionally integrating portions of each network user's traffic that have passed through a plurality of the channels.

In an embodiment, the plurality of non-transitory instructions are executable for implementing one of the beneficial allocations on the multi-channel network.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "MSO" or "multiple systems operator" refers without limitation to a cable, satellite, or terrestrial network provider having infrastructure required to deliver services including programming and data over those mediums. An MSO would own the infrastructure to implement the disclosed software and methods.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "channel" or "communication channel" refers to a physical transmission medium, such as a wire or optical cable, or a designated non-tangible broadcast medium, such as a wavelength used to convey an information signal from a sender(s) to a receiver(s). A channel has a certain capacity for transmitting information, often measured by its bandwidth in Hz or its data rate in bits per second.

Disclosed herein is a method that minimizes the variance of traffic flow in each channel and, optionally, at the same time or alternatively minimizes the difference of the expectation of traffic flows between different channels in a network. The method is based on mean-variance optimization and modern portfolio theory. The method assumes that different users (or service groups, or any traffic origins) have different traffic patterns. This is true in most networks because of the nature of user behaviors and the nature of data traffic, especially in networks containing multiple SLAs. Furthermore, the method also makes the following assumptions: the users in the same network have the access to and share the same group of communication channels, e.g., DOCSIS 3.0/3.1 channels, WDM wavelength channels, etc., and the traffic from these users merges at a common hub in the network.

Figure 1:
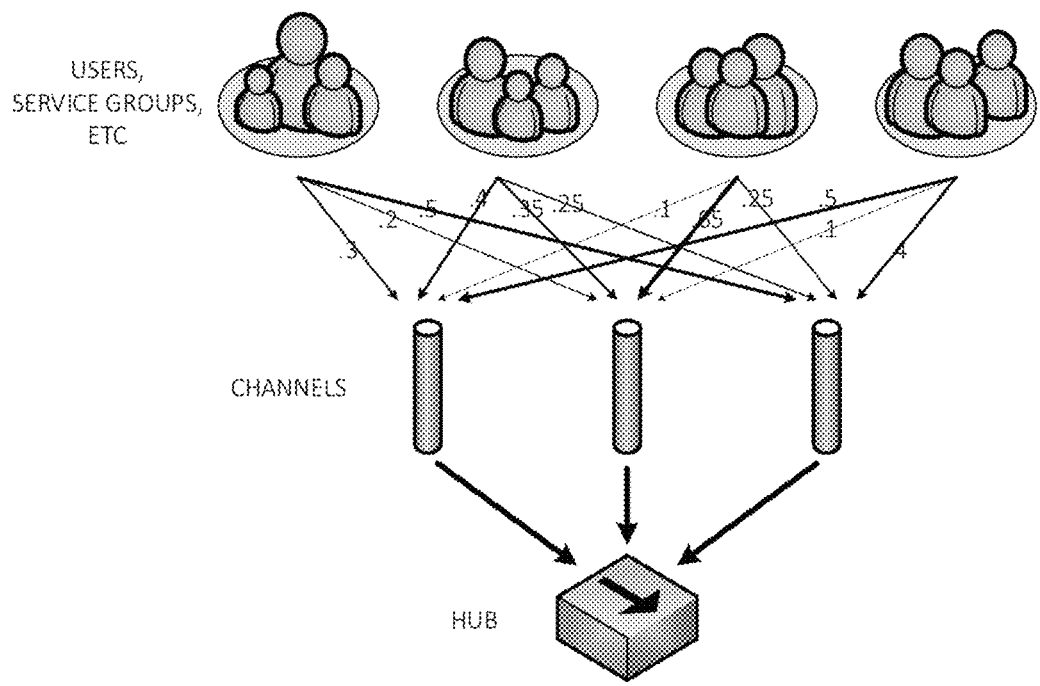
FIG. 1 is a system diagram illustrating a method of managing multi-channel network traffic, according to an embodiment.

FIG. 1 is a system diagram illustrating an exemplary communication system and method of managing multi-channel network traffic. The present methods are not limited by architecture, but for purposes of illustration, FIG. 1 shows a communication system including a hub communicatively coupled with three channels (although a "multi-channel network", as used herein refers to a system comprising two or more channels). The channels are communicatively coupled with one or more network users. In FIG. 1, data transfer is depicted as uplink traffic, but it may alternatively be a downlink traffic or a combination of uplink and downlink traffic.

The hub is any system (e.g., a cable modem termination system (CMTS)), device, software, or combination thereof, typically located in a cable company's hub site, or "headend", which is used to provide high speed data services (i.e., the downstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to specify one or more channels for transmitting and/or receiving data from a network user. Taking advantage of this fact, an exemplary method first characterizes users' (or user groups') traffic patterns including the expectation in bps and the variance in (bps)² of bandwidth consumption according to users' historical data. Second, the method partitions each user's traffic and allocates a portion of the traffic to each channel. For example, 30%, 20%, and 50% of the traffic generated from the leftmost user/service group of FIG. 1 is allocated to the three channels, respectively. As shown, each channel contains a mixture of traffic from multiple users. The criteria of the partition are to minimize the variance of traffic in each channel and, optionally, to minimize the difference of the expectation of traffic between different channels. These criteria are approached by using the algorithms described herein. Third, the method integrates the traffic that has been partitioned and passed through multiple channels, if necessary.

Figure 2:
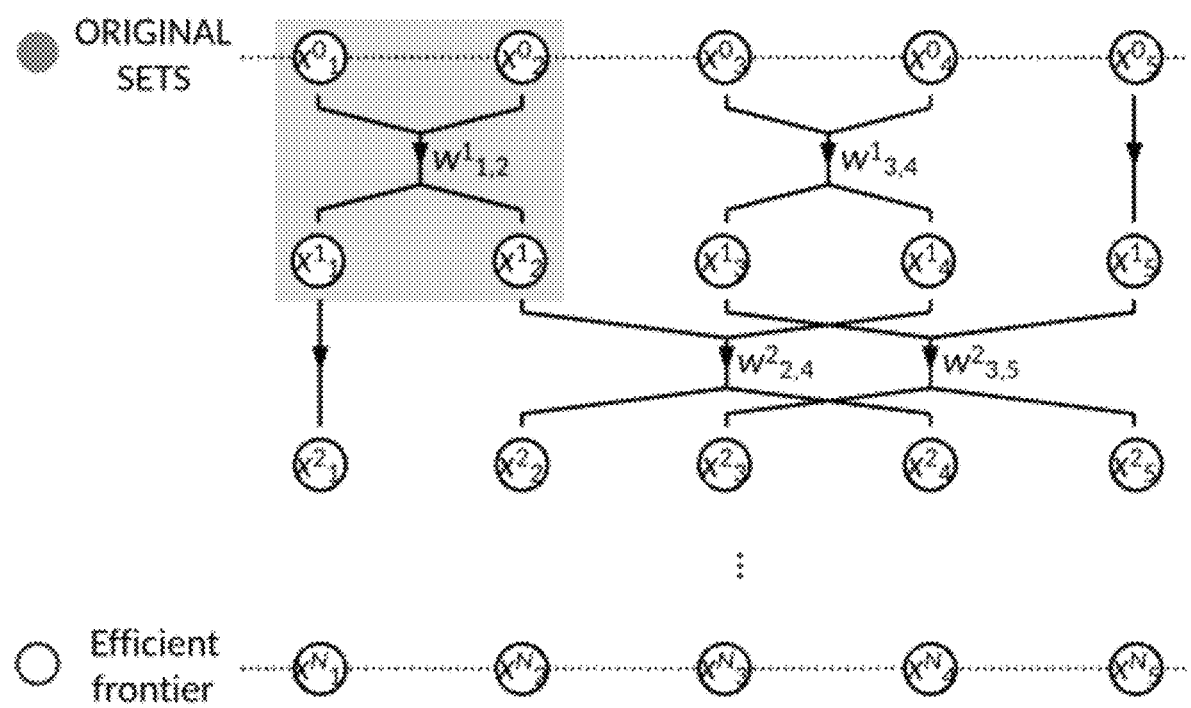
FIG. 2 is an algorithm flow diagram, according to an embodiment.

An algorithm for partitioning and allocating traffic to channels of a multi-channel network is illustrated in FIG. 2. The traffic from each user, each service group, each traffic origin, each user group, each set of service groups, or each set of traffic origins is an original set. S denotes the total number of original sets. In the example in FIG. 2, S=5.

In an embodiment, original sets are randomly paired up. Each pair is mixed up and generates a new pair of sets. For all the newly generated sets, the same is repeated but with different pairing. This is repeated for N times of pairing. After n times, the pair of sets $x_i^n$ and $x_j^n$ are mixed up and generate $$x_i^{n+1} = (1-w_{i,j}^{n+1})x_i^n + w_{i,j}^{n+1}x_j^n \quad (1)$$

$$x_j^{n+1} = w_{i,j}^{n+1}x_i^n + (1-w_{i,j}^{n+1})x_j^n \quad (2)$$

where the weight $w_{i,j}^{n+1}$ is given by $$w_{i,j}^{n+1} = \min_w\left((1-w)^2 \text{Var}(x_i^n) + w^2\text{Var}(x_j^n) + 2w(1-w)\text{Cov}(x_i^n, x_j^n)\right) \quad (3)$$

Figure 3:
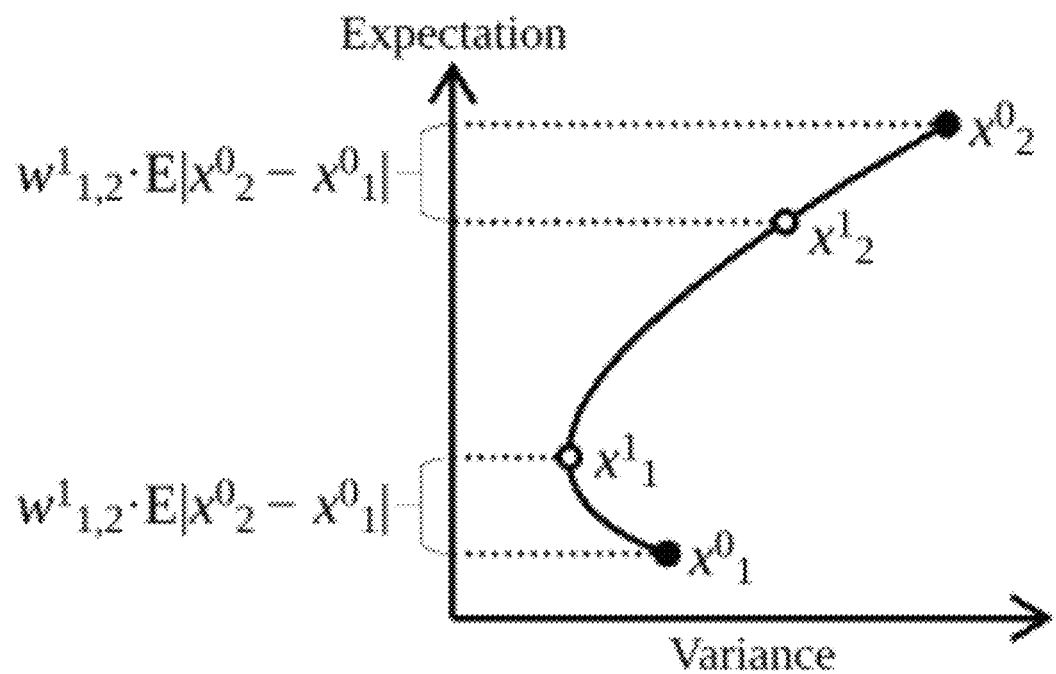
FIG. 3 is a graph for deriving $x_1^1$ and $x_2^1$ z from $x_1^0$ and $x_2^0$.

Figuratively, Eq. (3) finds the lowest variance point and its complementary point as the new sets, as shown in FIG. 3.

Figure 4:
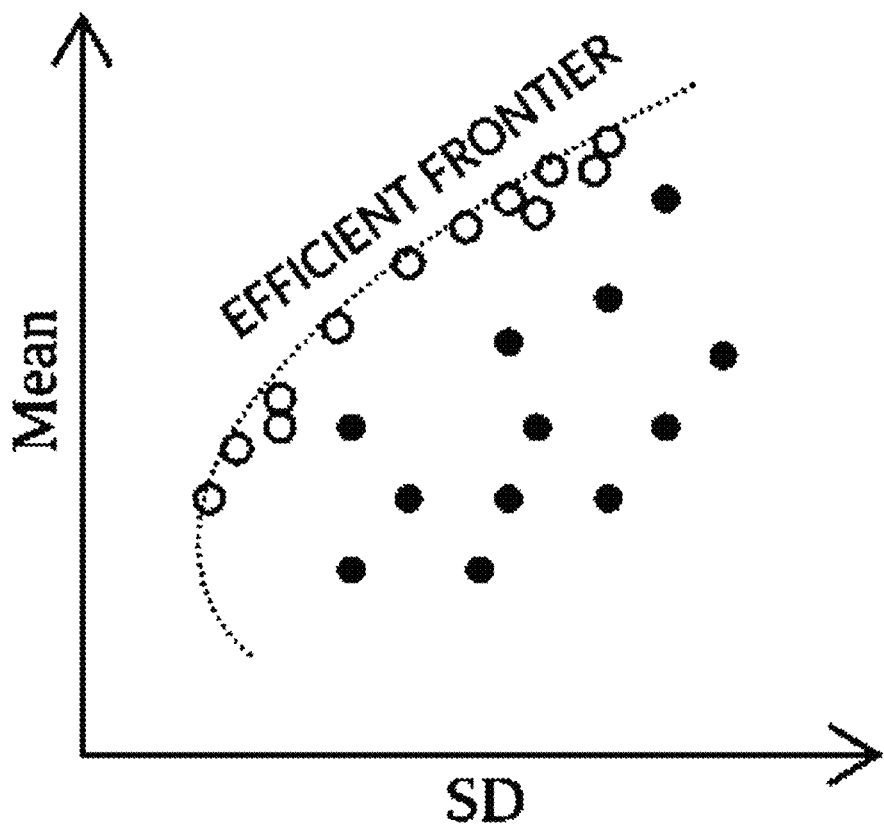
FIG. 4 is a graph of mean versus standard deviation (SD) distribution after implementation of the algorithm of FIG. 2.

The method changes the distribution of the sets on the expectation-variance (or mean-SD) plane. FIG. 4 is a graph of mean versus standard deviation (SD) distribution after the step of FIG. 2. As shown in FIG. 4, the method pushes the original sets (closed circles) toward the efficient frontier (open circles). The open circles have reduced variance and identical expectation compared with the original sets.

The total times of pairing N can be larger than $\log_2 S$, i.e., the traffic from one user may be partitioned into S portions.

Figure 5A:
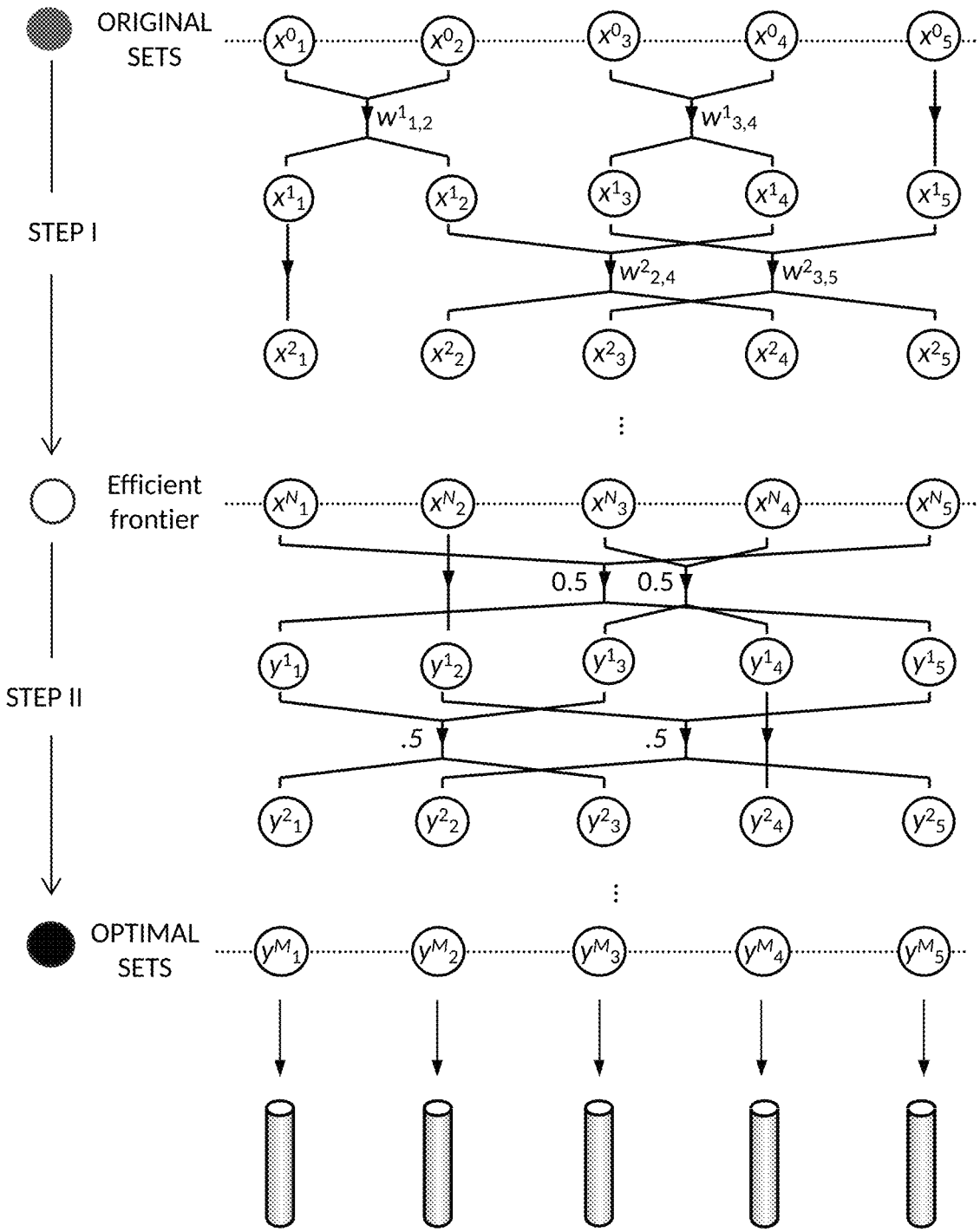
FIG. 5A is an alternative algorithm for limited separation depth scenarios, according to an embodiment.

An alternative algorithm may be implemented as shown in FIG. 5A. In this implementation, M+N≤$\log_2$ S'<$\log_2$S and step II is added as a procedure similar to step I but with all weights fixed at 0.5 and running for M times. By adding step II, the inputs of channels $y_i^M$ have a more concentrated distribution on the mean-SD plane, as shown by black dots in FIG. 5B.

Figure 6:
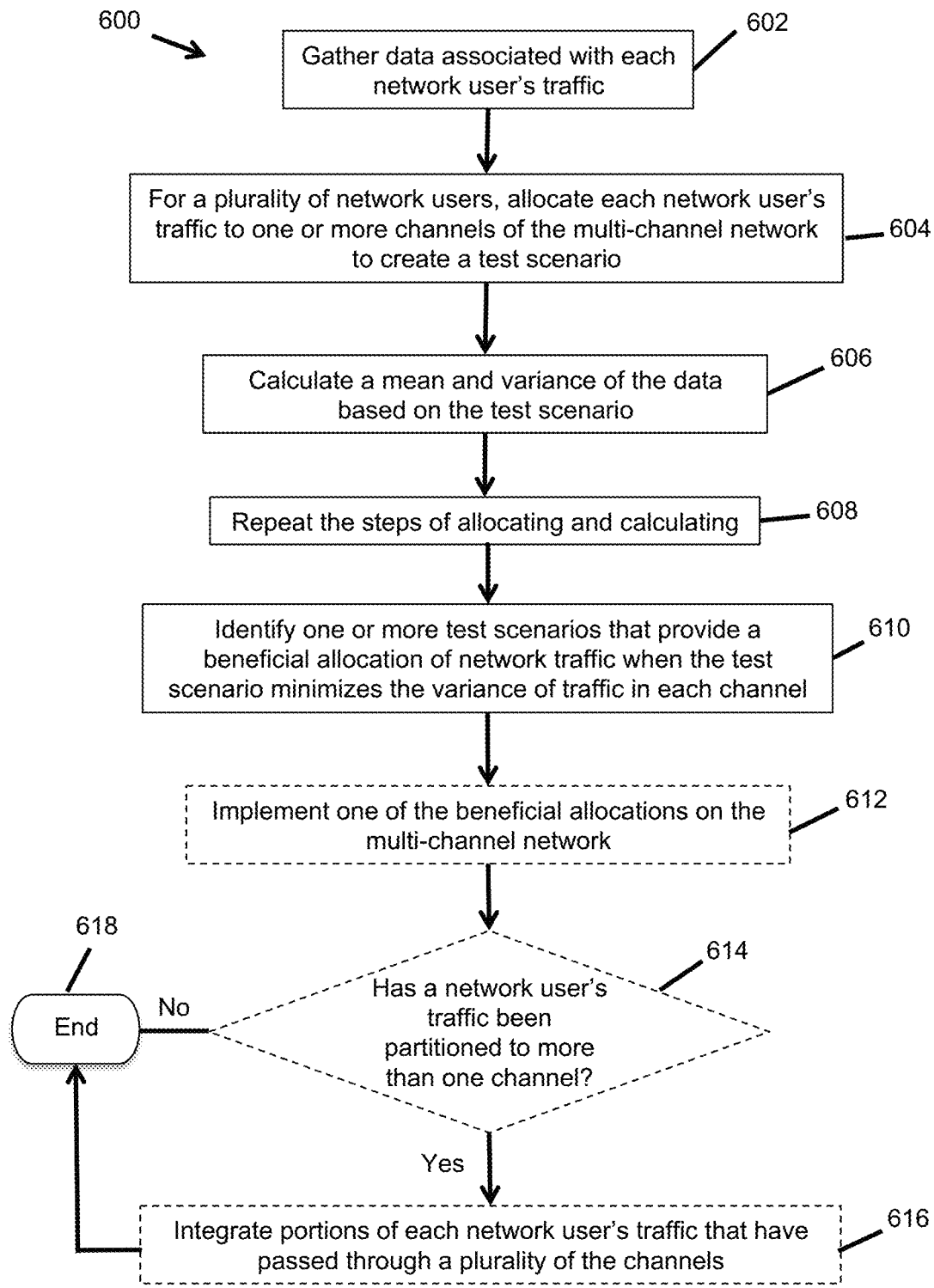
FIG. 6 is a flowchart illustrating steps in a method for managing multi-channel network traffic, according to an embodiment.

FIG. 6 is a flowchart 600 illustrating steps in a method for managing multi-channel network traffic. In step 602, data associated with each network user's traffic is gathered. For example, such data may include bandwidth usage, average bandwidth usage, mean bandwidth usage, bandwidth usage variance, temporal bandwidth usage, temporal bandwidth usage variance, service level agreement (SLA) type, geographic location, available infrastructure and/or uplink-downlink ratio. In step 604, for a plurality of network users, each network user's traffic is allocated to one or more channels of the multi-channel network to create a test scenario. A mean and variance of the data based on the test scenario is calculated in step 606. The steps of allocating and calculating are repeated in step 608, for example, until no further minimization of the variance of traffic in each channel is possible or necessary. In step, 610, one or more test scenarios that minimize the variance of traffic in each channel is/are identified as providing a beneficial allocation of network traffic. In optional step 612, one of the beneficial allocations is implemented on the multi-channel network. As part of this implementation, query 614 may ask "Has a network user's traffic been partitioned to more than one channel?" If the answer is no, the method ends with step 618. If the answer is yes, portions of each network user's traffic that have passed through a plurality of the channels are integrated/recombined in step 616, then the method ends with step 618.

Figure 7:
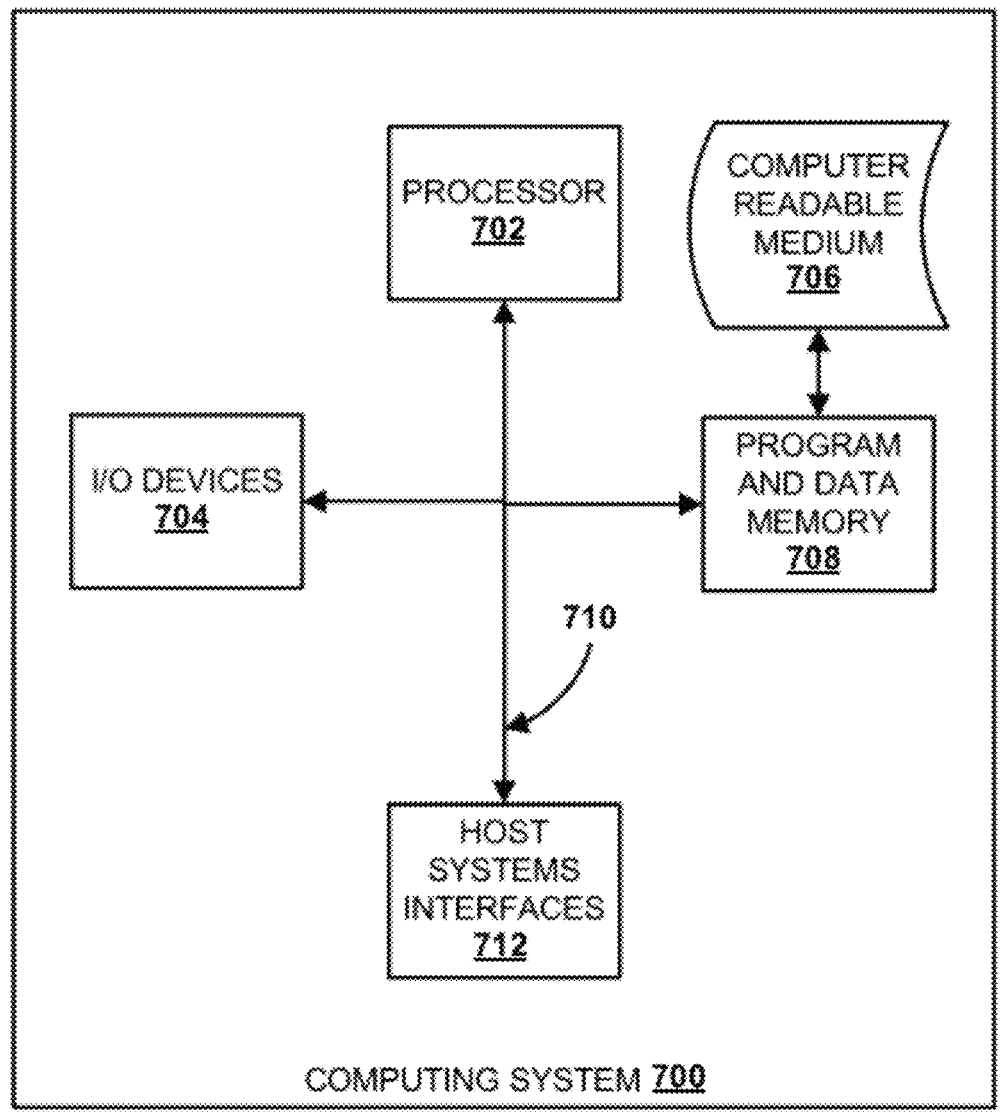
FIG. 7 is a block diagram of an exemplary computing system in which a computer readable medium provides instructions for performing methods described herein.

The embodiments herein may be implemented in a variety of ways as a matter of design choice. For example software and processors performing CMTS functions could be configured in a hub or a headend facility, and the physical layer functions could be in programmable hardware in the node. In this regard, the invention can take the form of an entirely hardware embodiment, an entirely software embodiment or an embodiment containing both hardware and software elements. In an embodiment, the invention is implemented in software, which includes but is not limited to firmware, resident software, microcode, etc. FIG. 7 illustrates a computing system 700 in which a computer readable medium 706 may provide instructions for performing any of the methods disclosed herein.

Furthermore, the invention can take the form of a computer program product accessible from the computer readable medium 706 providing program code for use by or in connection with a computer or any instruction execution system. For the purposes of this description, the computer readable medium 706 can be any apparatus that can tangibly store the program for use by or in connection with the instruction execution system, apparatus, or device, including the computer system 700.

The medium 706 can be any tangible electronic, magnetic, optical, electromagnetic, infrared, or semiconductor system (or apparatus or device). Examples of a computer readable medium 706 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 700, suitable for storing and/or executing program code, can include one or more processors 702 coupled directly or indirectly to memory 708 through a system bus 710. The memory 708 can include local memory employed during actual execution of the program code, bulk storage, and cache memories which provide temporary storage of at least some program code in order to reduce the number of times code is retrieved from bulk storage during execution. Input/output (I/O) devices 704 (including but not limited to keyboards, displays, pointing devices, etc.) can be coupled to the system either directly or through intervening I/O controllers. Network adapters may also be coupled to the system to enable the computing system 700 to become coupled to other data processing systems, such as through host systems interfaces 712, or remote printers or storage devices through intervening private or public networks. Modems, cablemodem and Ethernet cards are just a few of the currently available types of network adapters.

The apparatus, software and methods disclosed herein are further illustrated by the following Example. This Example is for illustrative purposes only and is not intended to limit the invention.

EXAMPLE

Figure 8:
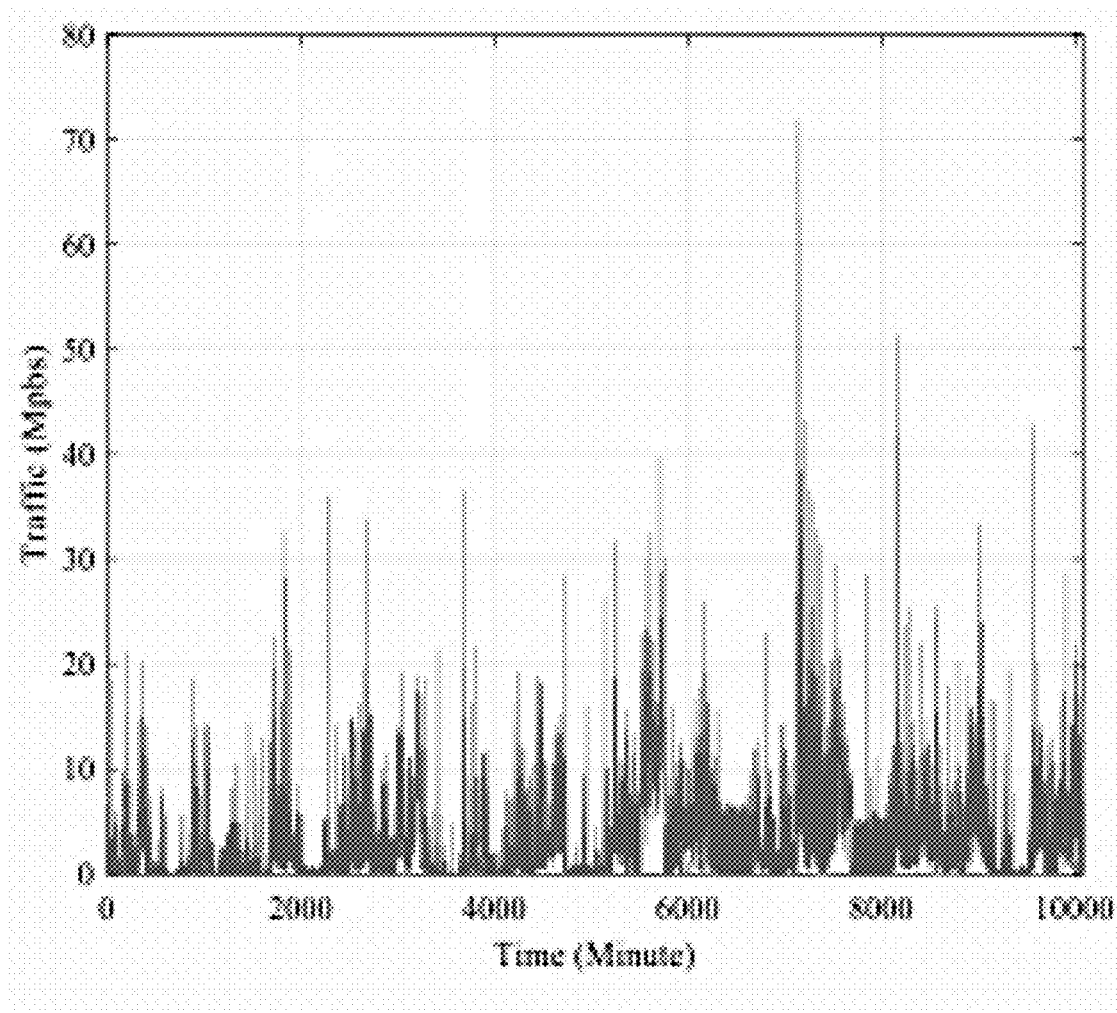
FIG. 8 shows traffic of an original set.

This Example verifies the method disclosed herein by using collected clients' downlink traffic data within a week. There are a total of 4,000 clients divided into 400 service groups with 10 (not a practical number) clients in each group, i.e. S=400. The total traffic from each group is treated as an original set. FIG. 8 shows the traffic of one of the 400 original sets. It has a mean of 3.4 Mbps and standard deviation (SD) of 5 Mbps.

Figure 5B:
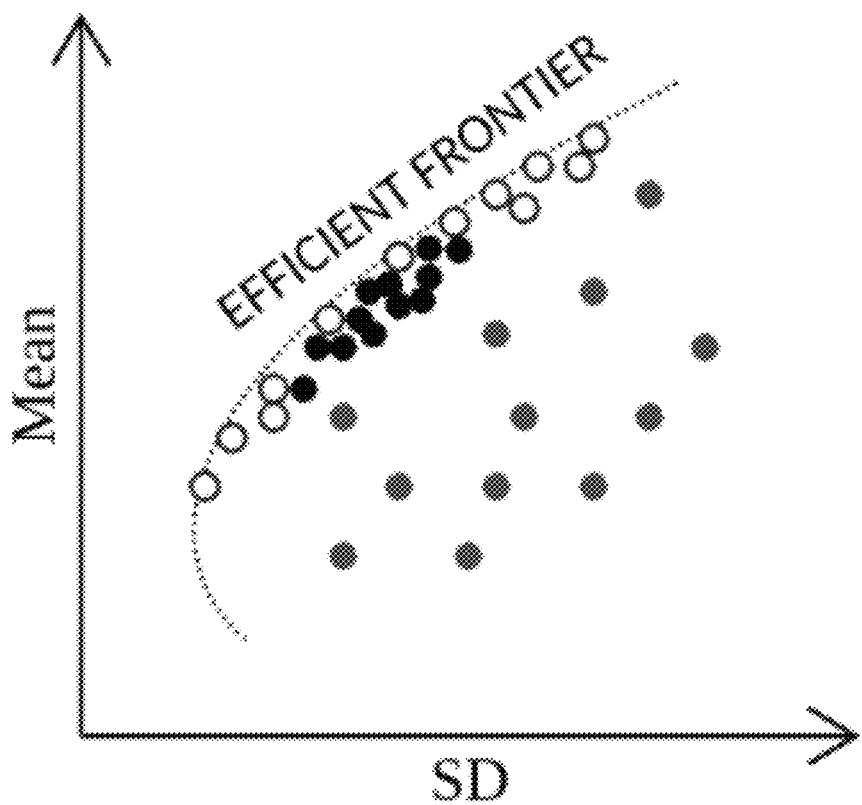
FIG. 5B is a graph of mean versus standard deviation (SD) distribution after implementation of the algorithm of FIG. 5A.
Figure 9:
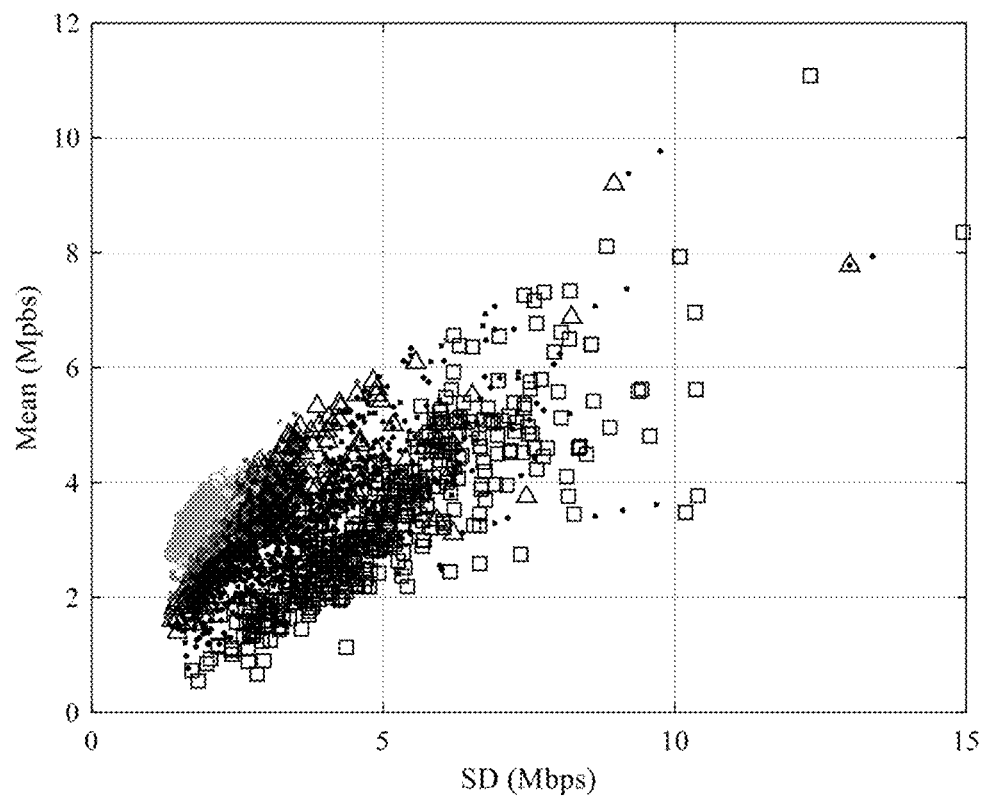
FIG. 9 illustrates mean-SD distribution of 400 original sets (squares), transition sets (dots), 400 efficient frontier sets (triangles), and the optimal sets (open circles) for an algorithm with N=3 and M=4.
Figure 10:
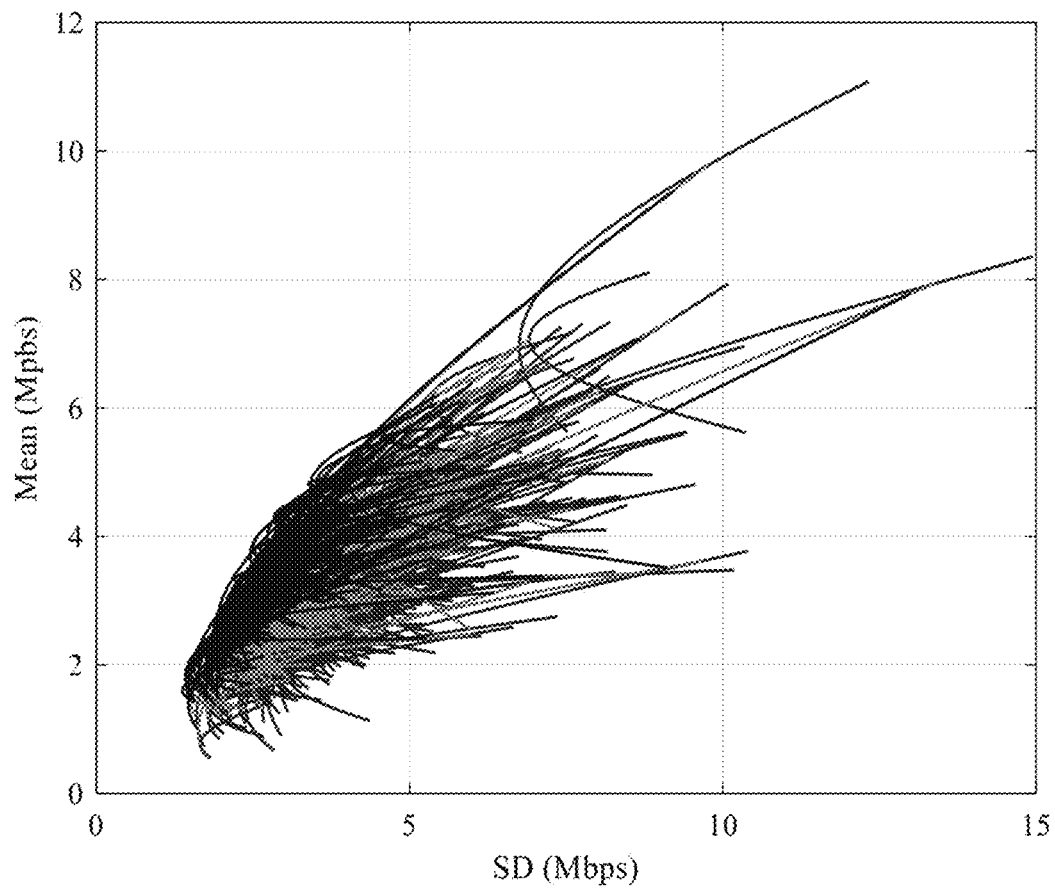
FIG. 10 illustrates pairing and curves in step I of FIG. 5 for an algorithm with N=3.

The open squares in FIG. 9 show the mean-SD distribution of the 400 original sets. When the algorithm in FIG. 5 is applied for the case where N+M<$\log_2$ 400, the distribution of efficient frontier sets after step I is illustrated by the triangles, the distribution of optimal sets after step II is illustrated by open circles in FIG. 9. With N=3 and M=4, the algorithm can provide very low SD values for all channels although different channels may experience different average throughputs. The transitioning grey dots are the mean-SD distribution of $x_i^n$ ($1 \le n < N$, $1 \le i \le S$). FIG. 10 shows the pairing curves corresponding to the curve in FIG. 5B. It can be observed that at the end of step I, the dark black curves are mostly monotonic (so is the efficient frontier). This becomes more obvious when we increase N, i.e. the depth of step I.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method of managing multi-channel network traffic comprising:
   gathering data associated with each network user's traffic;
   for a plurality of network users, allocating the data associated with each network user's traffic to one or more channels of the multi-channel network to identify allocations on an efficient frontier;

starting from the allocations on the efficient frontier, further allocating the data associated with each network user's traffic to one or more of the channels to obtain secondary allocations;

calculating a mean and variance of the data according to each of the secondary allocations;

identifying one or more of the secondary allocations as providing beneficial allocations of network traffic when the secondary allocation minimizes the variance of traffic in each channel; and implementing one of the beneficial allocations on the multi-channel network.

2. The method of claim 1, wherein the step of allocating each network user's traffic uses modern portfolio theory.

3. The method of claim 1, wherein the step of identifying a beneficial allocation of network traffic excludes any allocation that does not meet minimum service requirements.

4. The method of claim 3, wherein the minimum service requirements comprise a bandwidth equal to or greater than a required minimum bandwidth.

5. The method of claim 1, wherein the step of allocating each network user's traffic occurs by random allocation, pairing users with negatively correlated data, or pairing users with positively correlated data.

6. The method of claim 1, wherein the step of allocating each network user's traffic to one or more of the channels comprises partitioning the traffic of at least one network user to more than one of the channels.

7. The method of claim 6 further comprising integrating portions of each network user's traffic that have passed through a plurality of the channels.

8. The method of claim 1, wherein the multi-channel network is an optical network, a coaxial network, a hybrid fiber-coaxial (HFC) network, a wireless network or a combination thereof.

9. The method of claim 1, wherein a channel of the multi-channel network is a wavelength channel, an optical fiber channel, a coaxial channel, a wireless channel, a time/frequency/logical channel defined by protocols or a combination thereof.

10. The method of claim 1, wherein the traffic on the multi-channel network is only downlink traffic, only uplink traffic, both downlink traffic and uplink traffic allocated independently, or both downlink traffic and uplink traffic allocated in combination.

11. The method of claim 1, wherein each network user is a group of network users.

12. The method of claim 1, wherein the data is selected from the group consisting of bandwidth usage, average bandwidth usage, mean bandwidth usage, bandwidth usage variance, temporal bandwidth usage, temporal bandwidth usage variance, service level agreement (SLA) type, geographic location, available infrastructure and/or uplink-downlink ratio.

13. The method of claim 12, wherein temporal bandwidth usage comprises hourly usage, daily usage, seasonal usage or combinations thereof.

14. The method of claim 1, wherein the method is repeated continuously or periodically.

15. A non-transitory computer-readable medium having a plurality of non-transitory instructions executable with a processor to facilitate management of traffic over a multi-channel network, the plurality of non-transitory instructions being executable for:

gathering data associated with each network user's traffic;

for a plurality of network users, allocating the data associated with each network user's traffic to one or more channels of the multi-channel network to identify allocations on an efficient frontier;

starting from the allocations on the efficient frontier, further allocating the data associated with each network user's traffic to one or more of the channels to obtain secondary allocations;

calculating a mean and variance of the data according to each of the secondary allocations;

identifying one or more of the secondary allocations as providing beneficial allocations of network traffic when the secondary allocation minimizes the variance of traffic in each channel; and implementing one of the beneficial allocations on the multi-channel network.

16. The non-transitory computer-readable medium of claim 15 further comprising the plurality of non-transitory instructions being executable for partitioning the traffic of at least one network user to more than one of the channels.

17. The non-transitory computer-readable medium of claim 16 further comprising the plurality of non-transitory instructions being executable for integrating portions of each network user's traffic that have passed through a plurality of the channels.

18. The non-transitory computer-readable medium of claim 15, wherein identifying a beneficial allocation of network traffic excludes any allocation that does not meet minimum service requirements.

19. The non-transitory computer-readable medium of claim 15, wherein allocating each network user's traffic occurs by random allocation, pairing users with negatively correlated data, or pairing users with positively correlated data.

20. The non-transitory computer-readable medium of claim 15, wherein the data is selected from the group consisting of bandwidth usage, average bandwidth usage, mean bandwidth usage, bandwidth usage variance, temporal bandwidth usage, temporal bandwidth usage variance, service level agreement (SLA) type, geographic location, available infrastructure and/or uplink-downlink ratio.

* * * * *